Aug. 13, 1946.  Q. J. AABERG  2,405,727
GRAIN CARRIER
Filed March 24, 1945  3 Sheets-Sheet 2

Inventor
Quentin J. Aaberg
By E. V. Hardway,
Attorney

Aug. 13, 1946.  Q. J. AABERG  2,405,727
GRAIN CARRIER
Filed March 24, 1945  3 Sheets-Sheet 3

Inventor
Quentin J. Aaberg
By
E. V. Hardway
Attorney

Patented Aug. 13, 1946

2,405,727

UNITED STATES PATENT OFFICE 2,405,727

GRAIN CARRIER

Quentin J. Aaberg, Angleton, Tex.

Application March 24, 1945, Serial No. 584,648

2 Claims. (Cl. 214—83)

This invention relates to a combined grain carrier and elevator.

An object of the invention is to provide a carrier specially adapted for transporting grain, such as rice, which is harvested in fields of soft earth and which cannot be reached by ordinary trucks, or similar vehicles.

As is well known, certain grains, such as rice, are produced in fields which are flooded with water and when the crop is being harvested ordinary vehicles cannot reach the combine to haul the grain away. It is a prime object of the present invention to provide a vehicle which is of such construction that it can be hauled to the combine, by a tractor, and filled with the grain being delivered by the combine, and which will deliver the grain to an adjacent highway where it may be transferred to a truck for delivery to the desired destination.

Another object of the invention is to provide a vehicle of the character described having a special type of body which is equipped with an elevator of special design for unloading the grain from said body into the truck.

With the above and other objects in view this invention has particular relation to certain novel features of construction, operation and arrangement of parts an example of which is given in this specification and illustrated in the accompanying drawings, wherein.

Figure 1:
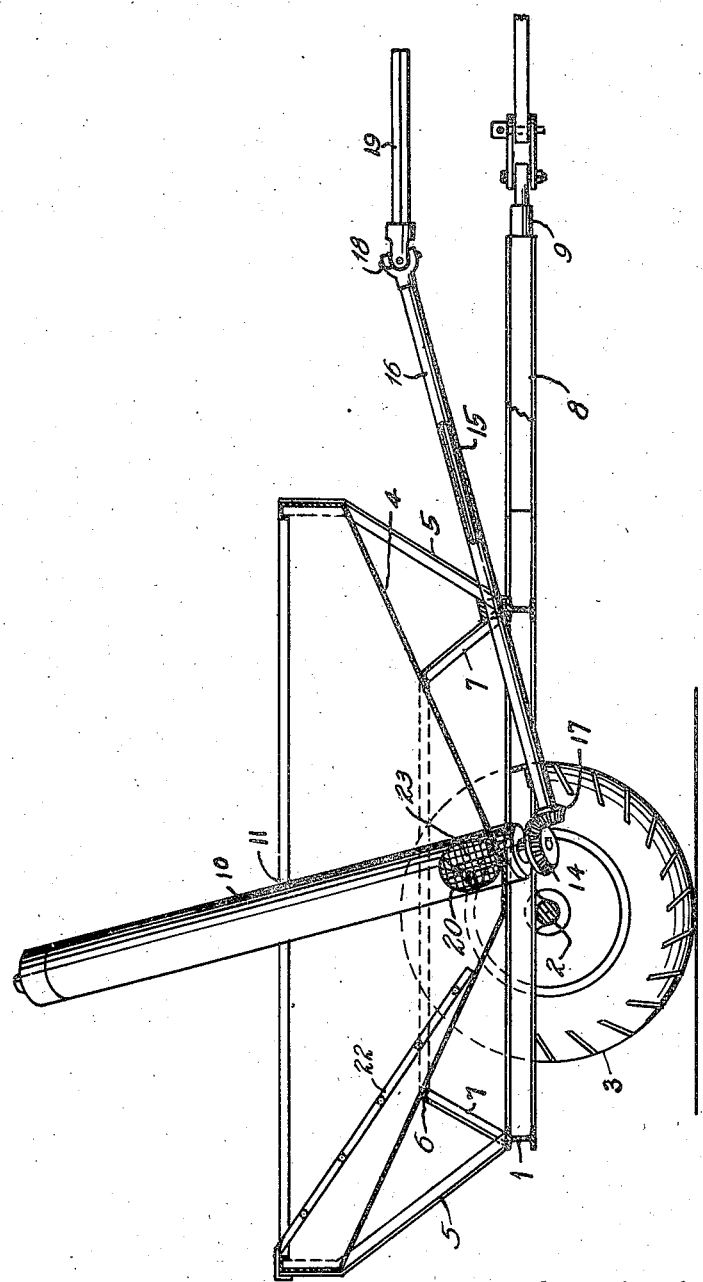
Figure 1 shows a side view, partly in section, of the grain carrier, taken on the line 1—1 of Figure 3.

Referring now more particularly to the drawings wherein like numerals of reference designate the same parts in each of the figures, the numeral 1 designates the main frame, which is, preferably, rectangular and may be composed of I-beams, as shown. This frame is mounted on a transverse axle 2 having the usual end spindles on which the ground wheels 3, 3 are mounted to rotate.

On the frame there is mounted a body 4, which is, preferably, hopper shaped. This body is, preferably, formed of sheet metal and its upper margin may be crimped inwardly, for strength, as shown more fully in Figure 1.

The body is reinforced and supported, at its corners, by the angle-iron braces 5 which are secured at their lower ends to the frame 1 and at their upper ends to said corners.

The body is further reinforced and supported by an intermediate supporting frame 6 which surrounds, and is secured to, the body and which, in turn, is supported and reinforced by the angle braces 7 which are secured, at their lower ends to the frame 1 and at their upper ends to the frame 6, as more clearly shown in Figure 1.

Fastened to the forward end of the frame 1 there is an A-frame 8 whose forward end is equipped with a hitch 9 by means of which it may be hitched to a tractor.

Figure 2:
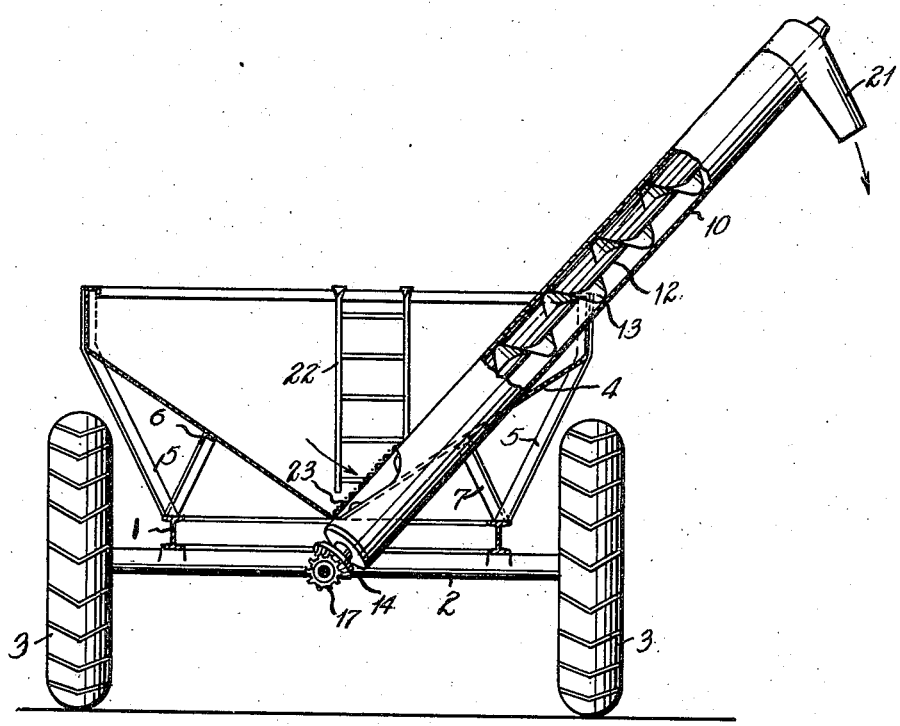
Figure 2 shows a cross sectional view taken on the line 2—2 of Figure 3.
Figure 3:
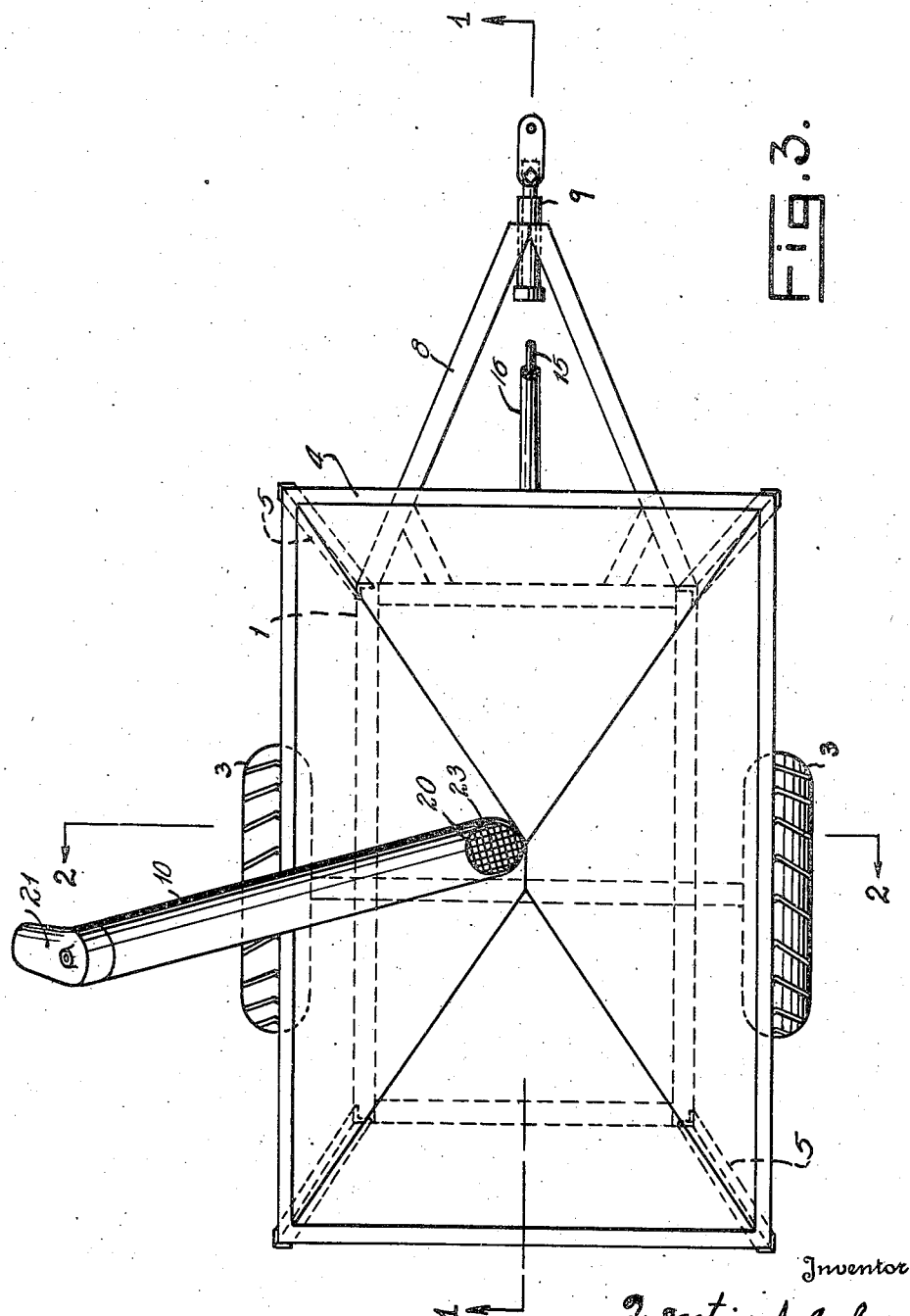
Figure 3 shows a plan view.

There is a tubular elevator housing 10 in, and whose upper end extends above, the body and which rests in a side notch 11, in the body. Its lower end extends through the side wall of the body, as shown more clearly in Figure 2. There is an elevator shaft 12, axially in the housing and whose upper and lower ends are mounted in bearings in the housing. On this shaft there is a conventional elevator screw 13 whose outer margin is closely adjacent the housing.

Fixed on the lower end of the elevator shaft there is a beveled gear 14. A drive shaft 15 extends forwardly and is inclined forwardly and is housed in the tubular housing 16 which is anchored to the frame 1. The rear end of the shaft 15 has a beveled pinion 17 fixed thereon which is in mesh with, and drives, the gear 14 and the elevator shaft. This gearing, in practise, will be enclosed in a casing (not shown).

Coupled to the forward end of shaft 15, by a universal coupling 18, is a shaft 19 which is square in cross section. This shaft 19 telescopes into the conventional power take off of the tractor and is driven thereby.

In use the carrier is hitched to a tractor of a type which will travel over soft earth. The wheels 3 are high and have large tires so that they will support the body above the earth. The carrier may thus be hauled into the field and may be loaded with grain direct from the combine and then hauled to a truck on solid ground. The power take off may then be clutched with the tractor motor and the elevator started.

The housing 10 has a relatively large side opening 20 adjacent its lower end and within the body for the entrance of the grain into the housing, and the upper end of the housing has a downwardly turned chute 21. With this chute over the truck body the grain will be transferred from the carrier body 4 into the truck body for transfer to the desired destination.

It may be desirable to enter the body 4 to manually gather the grain left in the bottom of the body and deliver it into the elevator. For this purpose a ladder 22 may be provided for convenience in entry and exit. The upper end of this ladder may be hooked over the upper end of the body 4 with its lower end resting on the side of the body.

To protect the workman in the body 4 the opening 20 is covered with a grating 23 of coarse enough mesh so as not to interfere with the entrance of the grain.

The drawings and description are illustrative merely while the broad principle of the invention will be defined by the appended claims.

What I claim is:

1. A grain carrier comprising, a hopper-shaped body adapted to contain grain, and the like, and having a marginal side notch, a carriage on which the body is mounted, a tractor hitch on the carriage, an elevator housing extending diagonally through one side of the body with its lower end beneath the body and having an inlet at the bottom of the body and having a discharge end resting in said notch and arranged to discharge the contents of the body out beyond the body, an elevator in the housing, means arranged to be driven by the power take-off of the tractor and to drive the elevator.

2. A grain carrier comprising, a hopper-like body, a carriage for the body having a tractor hitch, a tubular housing that extends through the side wall of the body, whose lower end is extended beneath the body and whose upper end lies in a seat at the upper margin of the body and extends above the body, said housing having an inlet opening adjacent the bottom of the body, an elevator in the housing, a shaft one end of which is adapted to be connected to the power take-off of the tractor and whose other end is geared to the elevator to drive the same.

QUENTIN J. AABERG.